United States Patent [19]

Hodge et al.

[11] 4,314,760
[45] Feb. 9, 1982

[54] OPTICAL SENSING DEVICE

[75] Inventors: Malcolm H. Hodge, Claymont, Del.; Leroy Tabb, Jr., Glenside, Pa.

[73] Assignee: TRW Inc., Elk Grove Village, Ill.

[21] Appl. No.: 69,680

[22] Filed: Aug. 27, 1979

[51] Int. Cl.³ .............................................. G01C 3/08
[52] U.S. Cl. ..................................... 356/4; 250/227; 250/237 R
[58] Field of Search ...................... 356/1, 4, 445, 446; 250/237 R, 227

[56] References Cited

U.S. PATENT DOCUMENTS

| | | | |
|---|---|---|---|
| 2,468,042 | 4/1949 | Cranberg | 356/1 |
| 3,182,291 | 5/1965 | Nassimbene | 250/227 |
| 3,314,292 | 4/1967 | Schulte et al. | 356/4 |
| 3,327,584 | 6/1967 | Kissinger | 250/227 |
| 3,718,399 | 2/1973 | Kalman | 356/448 |
| 3,778,157 | 12/1973 | Brelot et al. | 356/4 |
| 3,940,608 | 2/1976 | Kissinger et al. | 250/227 |

Primary Examiner—S. C. Buczinski
Attorney, Agent, or Firm—Neuman, Williams, Anderson & Olson

[57] ABSTRACT

A sensor for sensing a light-reflecting surface is provided including an element for emitting light onto such surface to be sensed. Reflected light from such surface is received by a light sensitive element. In accordance with this invention, a mask is interposed between the reflecting surface and the light sensitive element whereby the quantity of reflected light reaching the light sensitive element varies as a predetermined function of the element-surface interval. The provided sensor may thus convert reflected light quantities directly into signals which are a function of conditions existing at the intervals at which such reflecting surfaces are located.

14 Claims, 10 Drawing Figures

OPTICAL SENSING DEVICE

This invention relates to an optical sensing device, and more particularly pertains to a sensor adapted to accurately measure linear distances to a light reflecting surface by measurement of light reflected therefrom through a novel light occluding mask. By appropriate formation or "programming" of the light occluding mask, the light intensities or quantities reaching the light sensitive element may vary as a predetermined function of the distance at which such reflecting surface is located.

The use of optical sensing devices for measuring linear distances by means of reflected light rays is known in the art. Such sensing devices have many advantages other known distance-measuring devices lack. Most notably, optical sensors do not require contact with the surface being sensed. Also, as light and not electricity is employed for intersurface measurement by the sensing instrument, precautions necessary when electrical sensing instrumentation is employed such as use of appropriate electrical insulation are not necessary.

Optical sensors of the prior art emit light as by an optic fiber. The light is reflected from the sensed surface back into the sensor through receptor optic fibers. The reflected light signal is then sensed by a photo sensor and converted to an electrical signal proportional to the amount of reflected light, which signal may in turn be converted into distance units.

In such prior art devices the reflected light falls on the optical sensor sensing element or probe which employs receptor optic fibers. The illuminated area becomes larger and larger during movement of the sensed surface from the sensor probe as the interval between the probe surface and reflecting surface increases and the emitted light propagates outwardly. As the reflected light area becomes larger on the receptor fibers, there is a rapid growth in the generated signal until a peak signal is generated when the area of reflected light is equal to and covers the receiving end of the probe receptor fibers. After the reflected signal area exceeds that of the probe receptor fibers, the light intensity decreases together with the signal generated by the photocell output. Such decrease is proportional to the square of the distance between the probe and reflecting surface.

Known prior art optical sensors are subject to an undesired operational characteristic necessitated by the sensing element or probe structure employed. Such structure comprises the use of discrete optic fibers for light transmitted to the sensed surface and for reception of the light reflected from such surface. The sensors of the type hereinafter described in detail may be employed in applications measuring distances in micro-inches which distances are traversed by movable light-reflecting reference surfaces disposed very close to the sensor probe. However, the light signal output of prior art sensor probes is discontinuous when disposed close to the reference surface owing to the occlusion of reflected light from the receptor fibers by the probe light-emitting fibers themselves. Thus in the initial portion of the measuring range where great sensitivity is often desired, the light signal output of the prior art optical sensors is discontinuous.

It is an object of the provided invention to overcome the light "self occlusion" problem of prior art optical sensors by the utilization of a probe having a single light-guide from which the continuous light signal is emitted and into which the reflected light is passed. Such simultaneous passage of the light signal in one direction and reflected light in the opposite direction is made possible by a novel light guide structure. In such structure the continuous light signal passes to the reflecting surface from a light source through a guide central core portion and is reflected back into a guide central portion larger than the emitting core portion. A light-sensitive means such as a photo diode in optical communication with the reflected light converts the reflected light into a distance-indicating electrical signal. The novel light guide employed in the sensing probe of the provided optical sensor thus enables a continuous and unambiguous signal to be provided, theoretically from infinity to the point of contact with the light-reflecting reference surface.

It is another object of this invention to provide an optical sensor employing a novel light occluding mask whereby the area of the sensing element or probe of the provided optical sensor presented to the reflecting surface for reception of the reflected light varies as a linear function of the radius of the illuminated surface area, and thus as a linear function of the distance of the sensor from the reflecting surface. Such linear relationship exists until the area of reflected light exceeds that of the entire end surface of the sensing element whereafter the light signal decreases with the square of the distance between the sensor and surface.

In a broader aspect of the provided invention it is an object to provide an optical sensing system in which a light mask is interposed between a light-reflecting surface and the light-sensitive element of the system whereby the amount of reflected light permitted to pass to the light-sensitive element varies as a predetermined function of the interval between said sensor end and said reflecting surface.

Thus the mask may serve as a program adapted to permit passage of predetermined light intensities to the light-sensitive element which may be translated not only into the linear distances but conditions coexisting with such linear distances. For example, measurement of movement of a pressure sensitive diaphragm may be converted into light signals by way of masked, reflected light passing to a photo sensor which in turn converts such signals into signals or readings corresponding to pressures creating such diaphragm movement.

By way of a further example, measurement by reflected light of intervals between the optical sensor of the invention and liquid levels of a storage container of irregular sectional configuration may be directly converted into volumes corresponding to each container level. Such conversion is effected by an appropriately designed mask adapted to permit passage of a light intensity from each light reflecting surface which is proportional to the volume represented by such surface. Thus the light masks employed in the optical sensors of this invention are seen to comprise programs in which the light signals permitted to reach the light-sensitive element may vary as any desired function of the interval between the sensor and reflecting surfaces.

It is another object of this invention to provide an optical sensor which is extremely flexible in operation so as to be adaptable for use in a large number of measuring applications, including position sensing, monitoring of quality control by sensing of surface finishes, vibration monitoring, etc.

It is yet another object of this invention to provide an optical sensing device composed of inexpensive components which are readily assembled and amenable to high production techniques.

It is another object of this invention to provide an optical sensor which is durable in operation employing no moving parts, and is efficiently operable over an extremely broad temperature range.

The above and other objects of the invention will become more apparent from the following detailed description when read in the light of the accompanying drawing and appended claims.

In an embodiment of this invention, a light source such as an LED is mounted on one end of an optic fiber whereby a constant light signal is conveyed by such fiber into a translucent housing in which the second fiber end is concentrically disposed. A light signal passing from the fiber end is emitted from the center of the end surface of such housing onto a light-reflecting surface to be sensed. Reflected light passes into the translucent housing and propagates past the housing discharge end, including the annular portion surrounding the central signal. The reflected light is conveyed by the housing to a light-sensitive means such as a photo diode which generates a signal indicative of the amount of reflected light. The photo diode may be remotely located relative to the housing by employing an interconnecting optic fiber.

The sensor probe may have a translucent area defined by a light mask on its end and profiled so that as the reflected light discs which vary in area with distance strike the same, the translucent areas thereof permitting passage of the reflected light discs to the light sensor will vary linearly with the sensor-reference surface distances. The amount of reflected light passing through the housing end will thus be linearly inversely proportional to the intersurface distances.

In a modification of the provided sensor probe, the housing end opposed to the sensing end may define a convex focusing lens whereby the reflected light entering the translucent housing is focused and conveyed to the photo-sensitive element, insuring efficient capture of the reflected light.

For a more complete understanding of this invention, reference will now be made to the drawings wherein.

Figure 1:
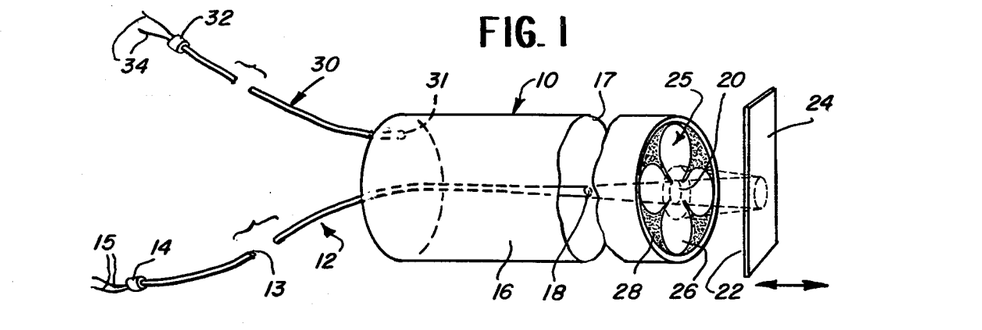
FIG. 1 is a fragmentary perspective view of a sensing probe of an optical sensor made in accordance with this invention.

Referring now more particularly to FIG. 1, a sensing probe 10 of an optical sensor is illustrated. Probe 10 comprises an optic fiber 12 which is appropriately clad at 13 about its periphery to prevent light loss and which is attached at one end to a light source such as a light-emitting diode 14. Wires 15 extend from the diode for attachment to appropriate circuitry enabling such diode to emit a constant, high intensity light signal. The signal is conveyed by the optic fiber 12 to a translucent housing body 16 which is also appropriately clad as at 17 about its circumference to minimize light loss.

The body of the cylindrical housing 16 may be composed of a clear translucent glass or plastic whereby the light signal discharging from terminal end 18 of the optic fiber 12 will conically propagate outwardly from the axis of the fiber 18 in accordance with the numerical aperture of the fiber. It will be noted from FIG. 1 that the light signal passing from the fiber 12 will pass through the end of the probe 10 through a central translucent opening 20 whereafter it will continue to propagate conically until striking surface 22 of body 24 which is to be sensed.

In the normal course of operation of prior art sensors, the optical sensor emits a light signal from a light guide such as optical fiber 12 of FIG. 1 onto a reflecting surface which is to be sensed. The reflected light is then received by a separate receptor optic fibers which convey the reflected light to a photosensitive element such as a photo diode which assists in converting the reflected light into an electrical signal which is indicative of the distance between the light-emitting probe and the light-reflecting surface.

It is apparent from FIG. 1 of the drawing that reflected light from the surface 22 is reflected back into end 25 of the sensing probe 10 through a translucent four-petal design extending from the central opening 20 through which the light signal from the optic fiber 12 passes from the probe 10. Petals 26 extending from the central opening 20 comprise clear surface portions of the body 10 whereas the shaded portion or mask 28 comprising the remainder of the end surface of the probe 10 is opaque. Accordingly, the light reflected from sensed surface 22 will pass back into the probe 10 only by passage through the clear, light-receiving petals 26 and the equally clear central portion 20 from which the light signal passing from the optical fiber 12 is emitted.

The light reflected back into the body of the housing 10 propagates through housing 16 to optical fiber 30 having one end 31 mounted on the housing end oppositely disposed to the petals 26. The opposite fiber end is optically coupled with a light-sensitive member such as photo diode 32 having wires 34 attached thereto for connection to appropriate circuitry whereby the light conveyed to diode 32 may be converted into an electrical signal. Such signal will be indicative of the interval between the light emitting end 25 of probe 10 and the sensed surface 22 of object 24.

Figure 5:
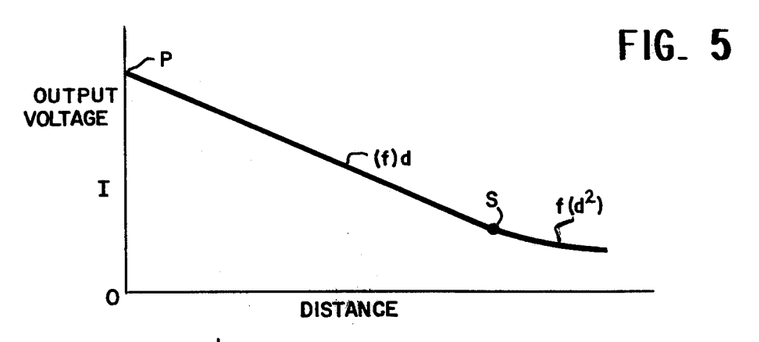
FIG. 5 is a graph schematically illustrating the linear relationship between the reflected light received in the sensing probe of the sensor of this application versus the distance between the sensing probe and the reference surface being sensed.

The light quantity and signal generated by the light emitted by the fiber 12 is at a maximum when the probe end 25 touches the surface 22 as indicated by point P in the graph of FIG. 5. In the absence of mask 28 all the reflected light is captured on the probe end until the generated reflected light disc from surface 22 exceeds the area of probe end 25. During the relative movement between the probe and surface 22 as defined by these two movement-end limits of probe-surface contact and maximum disc generation, a substantially uniform light quantity would reach the photo diode 32. It is the purpose of mask 28 to progressively occlude the reflecting light with increasing diameter of the reflected light disc as clearly seen from the illustrated mask embodiments of the drawing, and prevent such occluded light from reaching the photo diode 32. Thus, the quantity of the reflected light and resulting diode-generated signal is linearly decreased in proportion to the distance between the mask and reflecting surface as clearly evidenced by the graph of FIG. 5 of the drawing. As a consequence, signals generated by the light reflected from surface 22 will vary as a linear function of the inter-surface distances.

It is apparent that with increased interval between the probe end and the sensed surface 22, the disc of reflected light striking the probe end increases in diameter. Thus, the area of the clear portions 26 on the light sensing end of probe 10 which is presented to light reflecting from surface 22 varies as a linear function of the radius of the illuminated surface area as well as the distance of the probe end from surface 22.

The configuration of the translucent area defined by petals 26 and designed to provide light signals which vary linearly with distance between the light-sensitive element and the reflecting surface is arrived at as follows. It will be noted from FIG. 6 that with progressive distance between probe end 25 and surface 22, reflected light discs of increasing area will be reflected from surface 22 onto end 25. If it is desired to reduce light passage through each larger ring by 5% from the amount of light reflected onto the adjacent smaller ring, with each increasing radial unit a segment of each annulus must be rendered opaque to effect blockage of the desired 5%.

Figure 6:
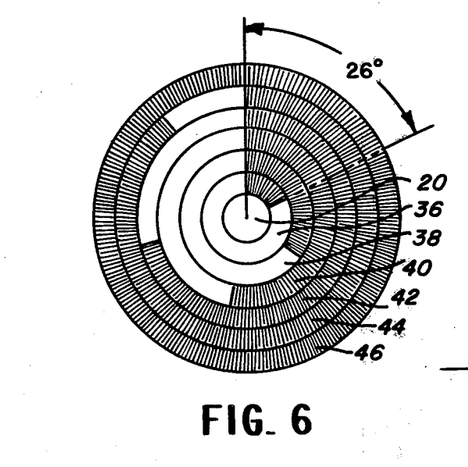
FIG. 6 is a representation of reflected light discs as appearing on the end of an optic sensor probe in the normal course of use.

Central disc 20 having a radius of 1 radial unit has no light loss as the light from fiber 12 is emitted therefrom. Assume that a 5% loss in reflected light is desired in adjacent innermost ring or annulus 36 which including disc 20 defines a solid disc having a radius of 2 radial units. The latter disc will have an area of $4\pi$ with the desired loss area of $4\pi \times 0.05$, or $0.2\pi$ in annulus 36. The final translucent area of the disc comprising disc 20 and annulus 36 is $4\pi - 0.2\pi$ or $3.8\pi$. The translucent area of annulus 36 only is $2.8\pi$. The $0.2\pi$ loss in area in annulus 36 is equivalent to a loss in degrees of approximately 24 degrees calculated from the following ratios:

$$0.2\pi/3\pi = x/360° \text{ or } x = 24°$$

FIG. 6 thus illustrates five discs formed by adding annuluses of one radial unit to annulus 36.

The above light loss information for the five annuluses 38 through 46 of FIG. 5 is tabulated in Table I.

The segment progressively lost or rendered opaque in each annulus 36 through 46 averages out to 26.30°. An average profile thus may be drawn, plotted on Cartesian coordinates, using the relationships $x = T \sin \theta$ and $y = T \cos \theta$ where T is the annulus radius and $\theta$ is the angle (displaced from a reference) of the last segment.

The resulting curves are species of the planar curves known as the Rhodonea of Grandi. The general equation for the rhodonea (rose) is:

$$\gamma = a \cos M \theta$$

If M is an integer, there are M petals if M is odd, and 2M petals if M is even. Thus, for the quadrifolium "rose" illustrated in FIGS. 1 and 2, M=2. In the foregoing equation "a" is a constant and $\theta$ is the displacement angle.

Figure 7:
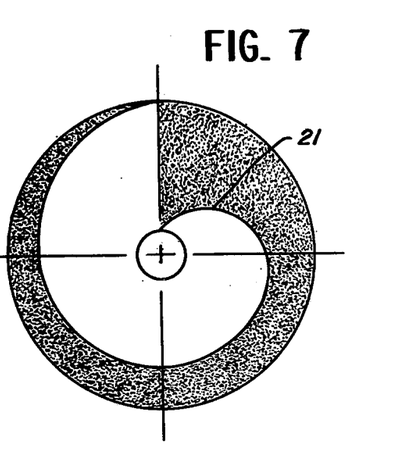
FIG. 7 illustrates a decal which may be applied to the end of an optic sensor probe to provide a linear reflected light distance relationship.

Using a single reference coordinate, an average profile may be drawn as lopsided spiral 21 in FIG. 7. Using four orthogonal reference coordinates, the four-petal or quadrifolium profile of FIGS. 1 and 2 results in which $\theta$ progresses in increments of $26.3° \div 4$ or $6.575°$. Other petaled configurations may obviously be utilized to provide the desired linear relationship by utilizing the desired number of axes on which to define the rhodonea.

TABLE 1

|  | No. | Radius Units | Total Area | Total Loss Req'd. % | Total Loss Area Total Disc | Lost Area From Latest Annulus | Segment of Annulus Loss (Degrees) | Final Area of Each Annulus | Total Disc translucent Area | % Light Transmitted |
|---|---|---|---|---|---|---|---|---|---|---|
| (Disc) | 20 | 1 | $\pi$ | 0 | 0 | 0 | 0 | $\pi$ | $\pi$ | 100 |
| Annulus | 36 | 2 | $4\pi$ | 5 | $0.2\pi$ | $0.2\pi$ | 24 | $2.8\pi$ | $3.8\pi$ | 95 |
| Annulus | 38 | 3 | $9\pi$ | 10 | $0.9\pi$ | $0.7\pi$ | 50 | $4.3\pi$ | $8.1\pi$ | 90 |
| Annulus | 40 | 4 | $16\pi$ | 15 | $2.4\pi$ | $1.5\pi$ | 77 | $5.5\pi$ | $13.6\pi$ | 85 |
| Annulus | 42 | 5 | $25\pi$ | 20 | $5.0\pi$ | $2.6\pi$ | 104 | $6.4\pi$ | $20.0\pi$ | 80 |
| Annulus | 44 | 6 | $36\pi$ | 25 | $9.0\pi$ | $4.0\pi$ | 131 | $7.0\pi$ | $27.0\pi$ | 75 |
| Annulus | 46 | 7 | $49\pi$ | 30 | $14.7\pi$ | $5.7\pi$ | 158 | $7.3\pi$ | $34.3\pi$ | 70 |

After traversing the translucent area 26 of the sensor end 25, the light reaching photo sensor 32 generates a signal which is linear relative to distance over that range of movement between the end surface 25 of probe 10 and surface 22 until the end surface is covered by the reflected light. The latter condition corresponds to point S in the chart of FIG. 5. Subsequent movement apart generates a light-reflecting disc which is greater in area than the area of probe end 25 and in which the light quantity decreases in proportion to the square of the inter-surface distance. FIG. 5 illustrates the mask-generated linear signal output versus distance relationship until signal S is generated whereafter the reflected light signal is a function of the square of the intersurface distance. Thus points P and S define upper and lower limits of the linear signal range obtainable with the probe 10. Appropriate circuitry may convert the signals generated after point S into appropriate distance units.

The effective linear range of operation of the provided optic sensor is dependent upon the fiber numerical aperture and the angle of divergence of the emitted light from the axis of the optic fiber employed. The formula for numerical aperture is $\sin^{-1} \sqrt{N_1^2 - N_2^2}$ where $N_1$ equals the fiber core refractive index and $N_2$ equals the fiber cladding refractive index.

Figure 8:
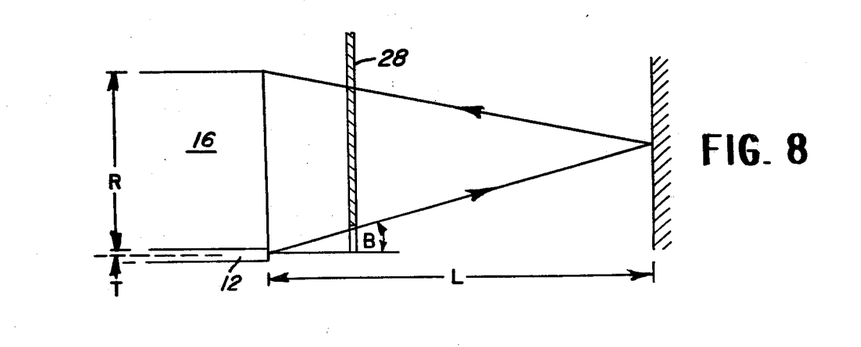
FIG. 8 is a graph schematically illustrating the relationship between the numerical aperture of a fiber employed in the sensing element and maximum interval measured.

FIG. 8 is a schematic representation illustrating the relationship between the angle of divergence B of the light emitted from fiber 12 and the radius R of the sensor end 25 in determining the linear range (L) of the sensor probe 10. The following table 2 demonstrates the increased linear range of an optical sensor made pursuant to this invention with decreasing numerical aperture and angle of divergence of the emitted light.

TABLE 2

Linear Response Range as a Function of Fiber Numerical Aperture and Sensor End Diameter

| Fiber N.A. | Angle | Sensor End Diameter (") | Linear Output Displacement (") |
|---|---|---|---|
| 0.17 | 10° | 0.14 | 0.200 |
| 0.38 | 25° | 0.14 | 0.084 |
| 0.56 | 33° | 0.14 | 0.055 |
| 0.17 | 10° | 0.28 | 0.400 |
| 0.38 | 25° | 0.28 | 0.168 |
| 0.51 | 33° | 0.28 | 0.110 |

N.A. = Numerical Aperture = $\sin^{-1} \sqrt{N_1^2 - N_2^2}$
$N_1$ = fiber core refractive index
$N_2$ = fiber clad refractive index It is further apparent that the higher the numerical aperture the greater will be the intensity or quantity of reflected light signal per unit of intersurface movement and thus the more sensitive such sensor is to movement.

Figure 2:
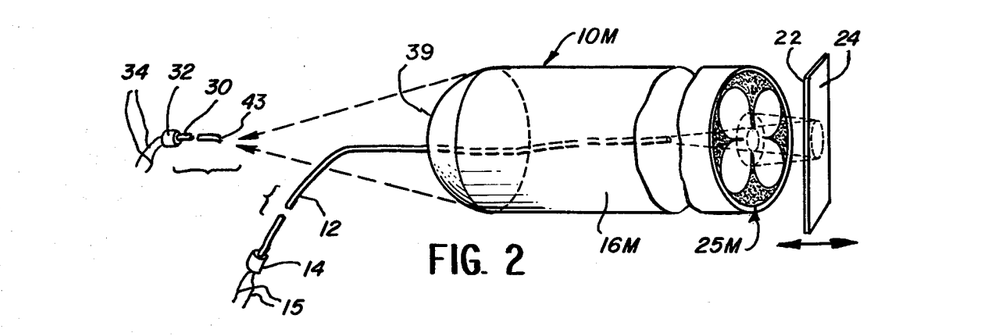
FIG. 2 is a view similar to that of FIG. 1 illustrating a modified sensing probe in which one end of a translucent body defining the probe functions as a light-concentrating lens.
Figure 3:
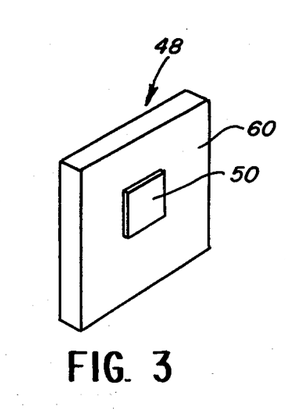
FIG. 3 is a perspective view of a transceiver module which may be incorporated in an optical sensor made in accordance with the teachings of this invention.

FIG. 2 illustrates a modified sensor probe 10M which employs a modified housing 16M. Although having the same light emitting and light receiving end as probe 10 of FIG. 1, oppositely disposed thereto is a convex end 39 which functions as a lens concentrating and focusing all of the light reflecting from surface 22 back into the probe end 39 as indicated by the dotted arrow lines, onto end 43 of optic fiber 30, fragmentarily illustrated, so that the received light may be conveyed to photo sensor 32. The modified sensor 10M is more efficient than sensor 10 of FIG. 1 in that the conical end 39 of the housing 10M functions to collect and focus all of the reflected light received from the surface 22 into the end 43 of the optic fiber 30. In the sensor 10 of FIG. 1, only that portion of the reflected light is conveyed by the optic fiber 30 which strikes end 31E of such fiber. It will be apparent that although the longitudinal cylindrical surface of probe 10M is appropriately clad to minimize light loss and end 25M is profiled as illustrated, end 39 is translucent to permit focusing of the received light on fiber end 43.

Figure 4:
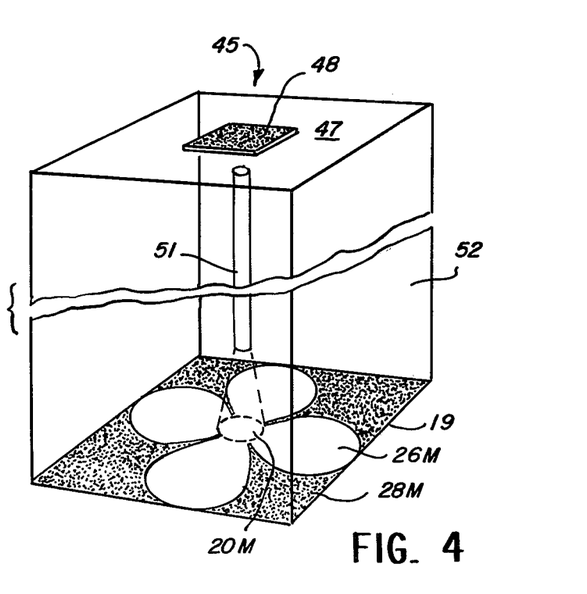
FIG. 4 is a perspective view of a modified light sensing probe which may be employed in an optical sensor made in accordance with this invention.

FIG. 4 illustrates a second modification of a sensor made in accordance with the teachings of this invention. The sensor 45 may be of rectilinear peripheral configuration as illustrated and have embedded in an upper end surface 47 thereof the transceiver module 48 of FIG. 4. Module 48 comprises a central LED 50 of minute dimensions e.g., approximately 60 mils square. Such transceiver modules are manufactured by TRW Optron of Tappan Circle, Carrollton, Tex. Thus, in FIG. 5 the transceiver 48 may have a desired high intensity light signal generated by the LED 50 passed to the end of optic fiber 51 embedded in translucent housing 52. The light signal is then passed from the end of the housing 52 in the manner previously discussed with respect to fiber 12 of FIGS. 1 and 2. It will be noted from FIG. 5 that the same type of light passage occurs in end surface 17 utilized in the rectilinear sensor 45 as in end 25 of the cylindrical probes 10 and 10M of FIGS. 1 and 2. Light propagates through central translucent portion 20M from the end of the clad fiber 51 and the reflected light from the sensed surface (not illustrated) passes back into end 19 through translucent area 26M profiled to provide the desired linear relationship between light generated signals and distance. The reflected light propagates upwardly through translucent body 16M of probe 44, striking the surface portion of transceiver photo diode 60 surrounding the LED 50.

It will be apparent from the foregoing that a novel optic sensor has been provided which enables a continuous and linear signal output versus distance to be generated by virtue of the novel profiled light admitting entrance end of the provided sensor probe.

The various sensor embodiments above discussed have made obvious the relatively inexpensive components which may be utilized for fabricating such sensors.

Applicant's novel sensing elements employ the same light guide for both transmitting high intensity light signals and receiving the same, thereby obviating any self occlusion problem which exists in optic sensors of the prior art in which separate light emitting and receptor fibers are employed.

As above pointed out, optical sensors possess many advantages over sensors of other types previously used in the prior art. In addition to the inexpensive nature of their constructions, the above-discussed sensors are durable, may be employed in high production techniques, have no moving parts and may be employed in an extremely wide range of temperatures. The use of light signals varying over a wide range of frequencies is permissible. It is apparent that the provided sensors may be constructed so as to be of extremely small size and thereby readily employed in confined areas. Thus, it will be noted from Table 2 that contemplated probe diameters are in the range of less than 0.15 inch, optical fibers workable in the above-described probes having diameters in the range of 3-5 mils. Light sensing probes made in accordance with this invention may assume a myriad of shapes to enable the same to be utilized in specialized applications. The flexibility of glass fibers and housing bodies enable the probes to assume a large variety of multi-curved configurations.

For purposes of protecting either or both the light sensor emitting surface and the reference surface, interposed resilient bellows may be employed, such protective bellows may be resilient so as to compress and stretch with varying intersurface distances. Such a bellows surface will also prevent ambient light from interfering with the transmitted light signals. As an alternative to the use of a resilient bellows, the probe profiled surface may be placed in a tubular member extending to the sensed surface.

It is believed apparent from the foregoing that a number of modifications may be made in the above-described sensor and still remain within the ambit of the invention disclosed. In addition to presenting a profiled end surface which is instrumental in generating a signal that is linear relative to the intersurface distance, it should be appreciated that after the intersurface distance has exceeded the limit of linear signal generation, whereafter the reflected light spills outside the periphery of the probe end (point S in FIG. 5), the intersurface distances may still be determined by appropriate electronic circuitry. Such circuitry is responsive to the light signals which following the generation of the signal, are inversely proportional to the square of the intersurface distance. As an alternative, the light mask employed may be modified to compensate for non-linearity in the light intensity-versus-voltage output of the light sensitive element such as the photo diode of the provided optical sensor. Such modified profile would dispense with the need for linearizing circuitry.

As above noted, the masks provided with the photosensors of this invention function as programs which not only vary the reflected light linearly with intersurface distance, but also vary the reflected signals as predetermined functions of the intervals between the sensor and the sensed reflecting surface.

Thus, the masks may allow passage of light intensities which vary as a function of changes in surface location, or conditions coexisting with surface change such as pressure, volume, surface structure, etc. The profiles of the translucent areas and complementary opaque mask portions of the illustrated sensor probes given by way of example in the drawing comprise elements of sensor embodiments in which the permitted reflected light varies linearly with the sensor-surface interval. In accordance with the broadest aspect of this invention the employed light masking means which is located anywhere between the sensor light sensing element and reflecting surface may be a discrete element separate from the sensor and may vary as any predetermined function of the sensor-surface interval which function is programmed into the mask.

Still further, it should be noted that as an alternative to the formation of a mask by the application of an opaque surface coating 28 to the end of a sensing probe such as 10 illustrated in FIGS. 1 and 2, and probe 45 illustrated in FIG. 4, discrete cover members having an appropriate light passing profile may be snapped or otherwise secured over the end of the sensing probe. Such a cover is lopsided spiral 21 illustrated in FIG. 7 of the drawing which may be either a decal for adhesive attachment to a translucent probe end surface, or a cover which readily snaps on such probe and thus the light transmitting profile may be readily changed substantially instantaneously by the mere replacement of the appropriate cover or light mask on the probe end.

Figure 9:
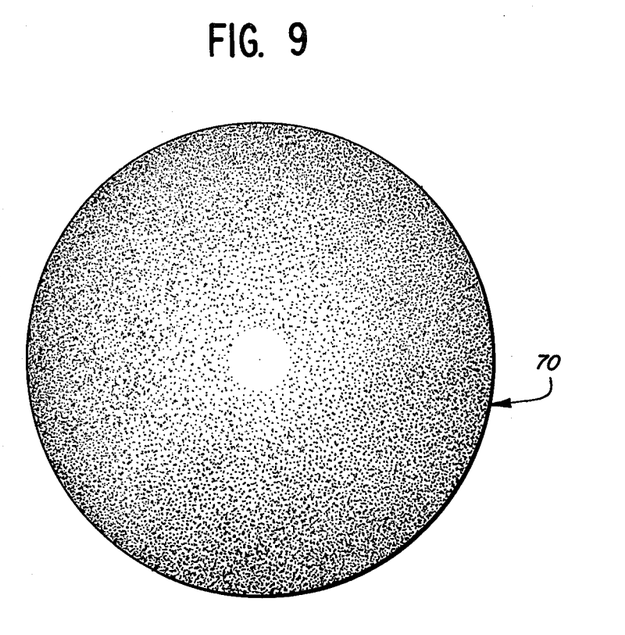
FIG. 9 illustrates a mask which may be applied to the end of a sensing probe in which the translucence of the mask graduates into opacity as the outer periphery of the mask is approached.
Figure 10:
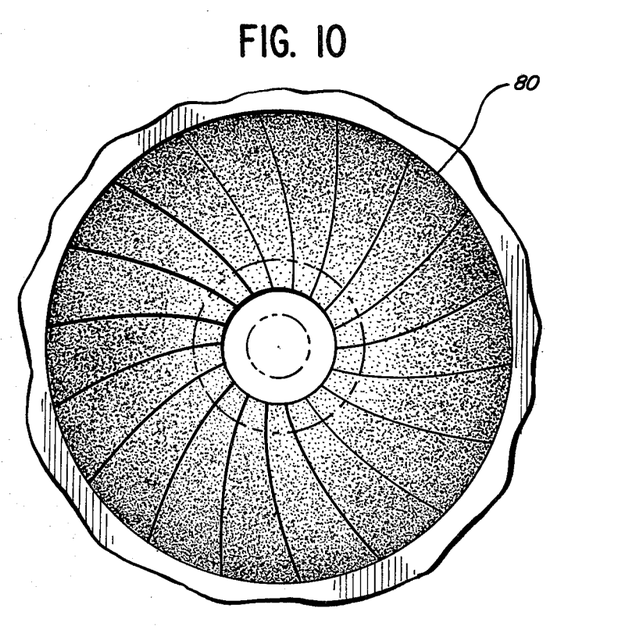
FIG. 10 is a mask similar to a camera iris diaphragm in which a central light-passing aperture may be adjustable in diameter and each of the diaphragm members may vary in translucency along the length thereof.

The term "mask" as hereinafter employed in the claims is intended to encompass not only light-occluding means such as the opaque areas of FIGS. 1 and 2 which define complementary translucent areas. Also encompassed is any means for reducing the passage of light such as a film similar to an exposed negative having a translucent opening for passage of light for striking the reflecting surface. The remainder of the film light mask may comprise areas surrounding the translucent area which gradually pass from translucence into opacity, see mask 70 of FIG. 9. Thus in FIG. 6 each annulus concentric with disc 20 may become progressively opaque as the overall disc diameter increases in size. The particular arrangement of the light masking or filtering elements of the mask define the program which allows predetermined light intensities to reach the light detector of the probe at various intersurface intervals. Also contemplated is the use of an adjustable mask such as a camera iris diaphragm in which the central opening is readily adjustable and the diaphragm elements become of reduced translucency as the outermost diaphragm periphery is approached or are otherwise configured in accordance with a desired program, see mask 80 of FIG. 10 in which the central opening may vary from the illustrated solid-line aperture to the smaller and larger adjacent apertures illustrated in phantom line.

It is believed apparent from the foregoing that a number of modifications may be made in the structural elements disclosed which remain within the ambit of this invention. Accordingly, this invention is to be limited only by the scope of the appended claims.

What is claimed is:

1. In an optical sensing system for measuring distances to a light-reflecting surface to be sensed, the combination comprising a light source for emitting a cone of light signal to a light-reflecting surface to be sensed; light-sensitive means for translating light received from a light-reflecting surface into signals corresponding to the light quantity received; light-masking means positioned between a light-reflecting surface to be sensed which is disposed on one side of said light-masking means, and said light-sensitive means which is disposed on the other side of said light-masking means and positioned a designed distance from said light sensitive means; said light-masking means having a first translucent area through which said cone of light and light reflecting from a light-reflecting surface to be sensed pass; said masking means having a second area surrounding said first area which is partially translucent for allowing a portion only of reflected light striking the same to pass therethrough to said light-sensitive means; said second area also having an opaque portion predeterminately formed for masking out increased quantities or reflected light with increased light-masking means to reflecting surface distance until the reflected light from such light-reflecting surface extends beyond the outer periphery of said masking means such that the quantity of reflected light reaching said light sensitive means varies as a predesigned function of the distance between said masking means and such reflecting surface.

2. The optical sensing system of claim 1 in which said light source is disposed on the same side of said light-masking means as said light-sensitive means and in which the light emitted from said light source passes through said light masking means first translucent area in a direction opposite to the direction of reflected light passing from such light-reflecting surface.

3. The optical sensing system of claim 1 or 2 in which said light sensitive means is positioned so as to be able to effect optical communication with light reflecting from a sensed light-reflecting surface at all times during normal sensing system operation.

4. The optical sensing system of claim 1 or 2 in which said first translucent area of said light-masking means allows unobstructed passage of light signals emitted by said light source for sensing a reflecting surface.

5. The optical sensing system of claim 1 in which a common light conveying means is positioned in said system for conveying light from said light source for passage through said light-masking means and impingement on such light-reflecting surface, and is also positioned for conveying reflected light passing through said light-masking means in the opposite direction from a surface to be sensed to said light sensitive means; said light sensitive means being in constant optical communication with reflected light entering said common light conveying means after passing through said light-masking means.

6. The optical sensing system of claim 5 in which a lens is positioned so as to be in optical communication with light reflected through said light masking means to said common light-conveying means and focuses such reflected light onto said light-sensitive means.

7. The sensing devices of claim 1 or 2 in which said light sensing system is adapted to sense light-reflecting surfaces indicative of material level in a storage container, said light-masking means being so formed such that the light quantity reflecting from each surface in such storage container and passing through said light-masking means and within the outer periphery of said latter means to said light-sensitive means is directly proportional to the material level in said storage container.

8. The system of claims 1 or 2 in which said reflected light masking means allows light quantities to pass which vary linearly with the interval between said light sensing means and such reflecting surface.

9. The optical sensing system of claims 1 or 2 in which said light masking means comprises complementary translucent and opaque surface portions.

10. The optical sensing systems of claims 1 or 2 in which said light masking means includes portions which vary in translucency in accordance with a predetermined program.

11. The optical sensing systems of claims 1 or 2 in which said light masking means are adjustable for permitting passage of different light quantities for each adjustment.

12. The sensing device of claim 5 in which said light source comprises an LED attached to one end of an optical fiber; said fiber having a second end terminating in a translucent body; said optical fiber and translucent body comprising said light conveying means; said translucent body having one end through which light from said LED passes to said light-reflecting surface and back into which light from such light reflecting surface passes; said light-sensitive means comprising a photo diode optically connected to light reflecting from such light-reflecting surface.

13. The sensing device of claim 5 in which said light source comprises an LED and said light sensitive means comprises a photo diode wherein both are joined together in a transceiver.

14. The sensing device of claim 1 in which said translucent areas of said masking means are defined by curves comprising Rhondonea of Grandi.

* * * * *

UNITED STATES PATENT AND TRADEMARK OFFICE
CERTIFICATE OF CORRECTION

PATENT NO. : 4,314,760
DATED : February 9, 1982
INVENTOR(S) : Malcolm H. Hodge and Leroy Tabb, Jr.

It is certified that error appears in the above-identified patent and that said Letters Patent are hereby corrected as shown below:

Column 10, line 37 change "or" to -- of --

Signed and Sealed this

Thirty-first Day of August 1982

[SEAL]

Attest:

GERALD J. MOSSINGHOFF

Attesting Officer

Commissioner of Patents and Trademarks